INVENTOR.
GEORGE J. TOPOL
BY
*Albert L. Jeffers*
ATTORNEY

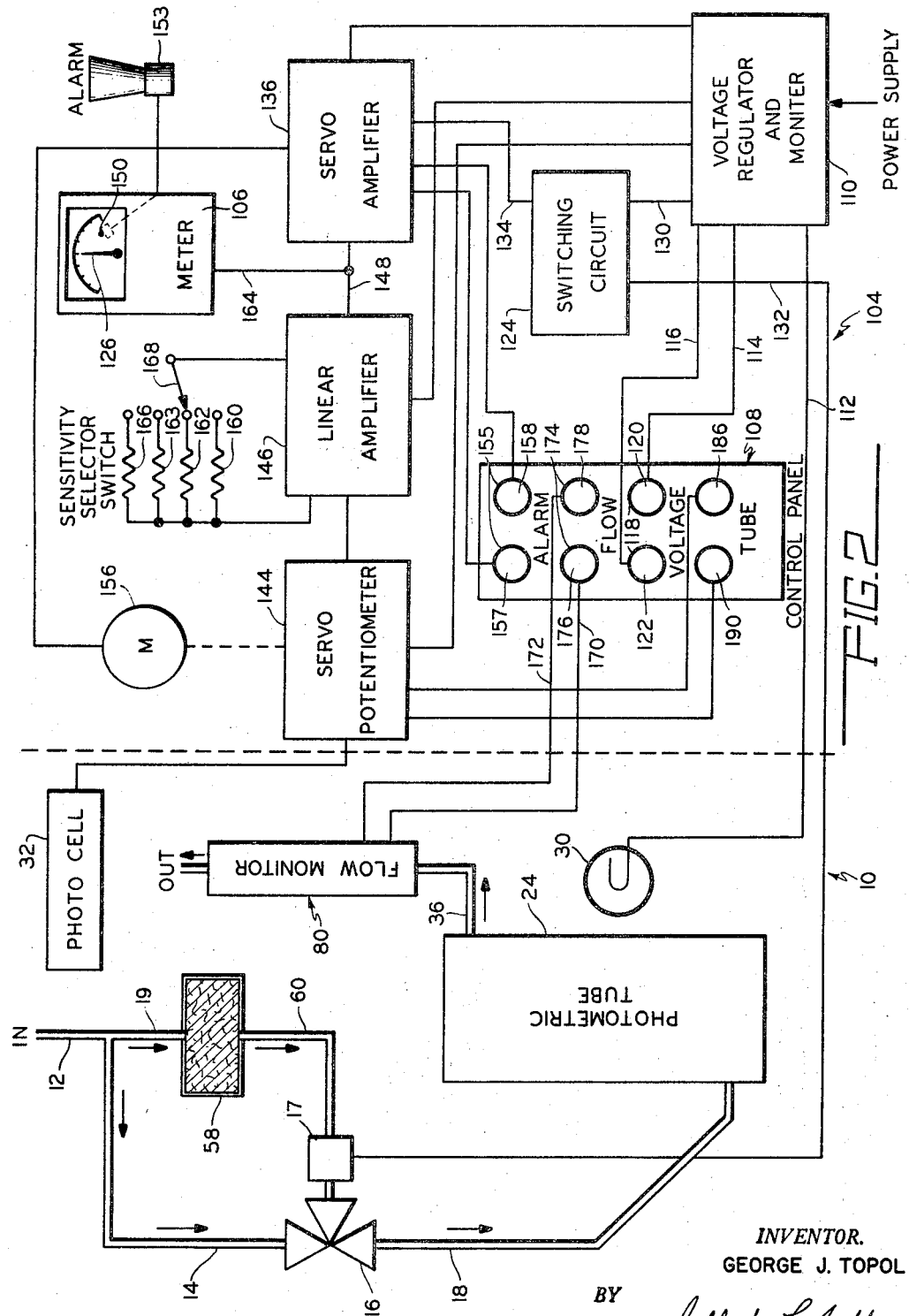

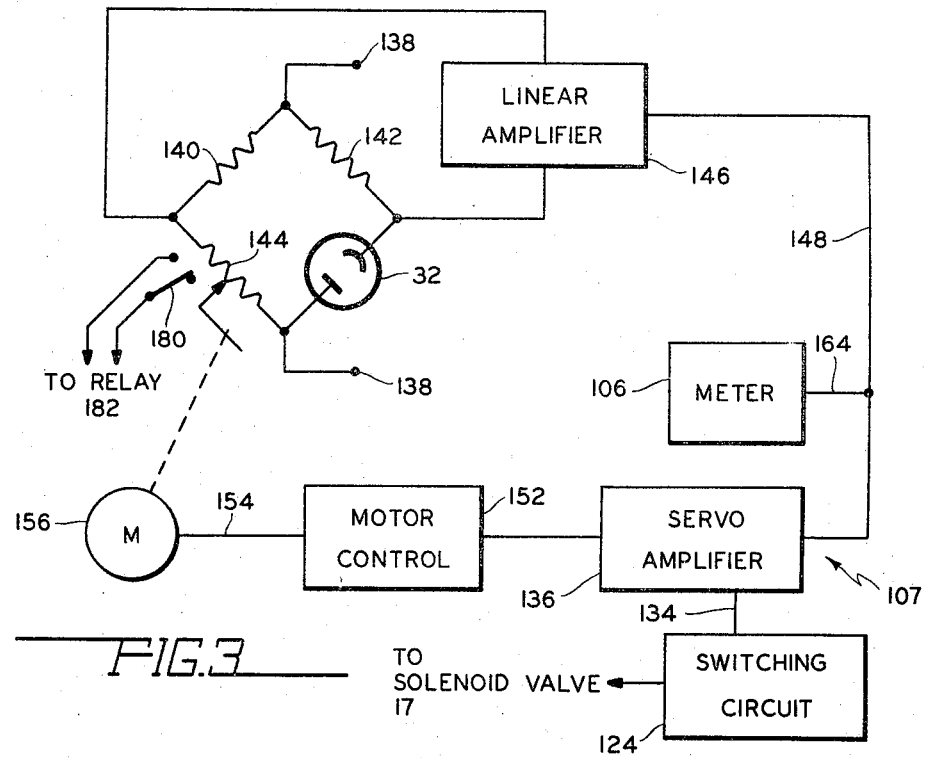
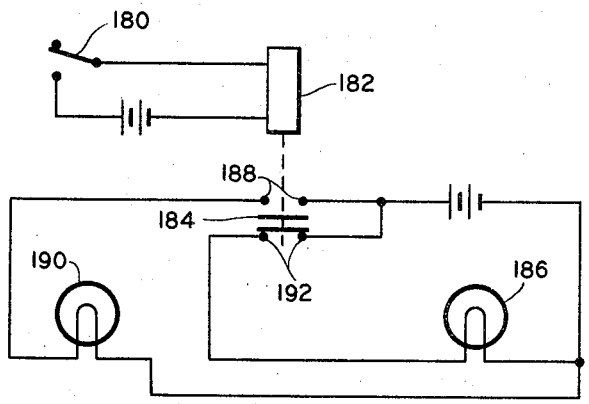

United States Patent Office 3,354,772
Patented Nov. 28, 1967

3,354,772
INSTRUMENT AND PROCESS FOR TESTING CONTAMINATION IN LIQUID MATERIALS
George J. Topol, Hamilton, Ontario, Canada, assignor to Bowser, Inc., Fort Wayne, Ind., a corporation of Indiana
Filed Nov. 16, 1961, Ser. No. 152,892
3 Claims. (Cl. 88—14)

This invention relates to an apparatus and process for detecting the impurity level in liquid materials such as fuels and the like and also for providing a qualitative measurement of the degree of contamination.

It is important, to the proper usage of many liquid materials, that they be substantially contamination-free and if an objectionable level of contaminants is present, it is also important to know the degree of contamination and relative amount thereof so that the liquid can be either discarded or reconditioned for proper usage. For example, the present invention was specifically designed for, but is not limited to, the monitoring or fuel materials which are used in modern jet engines for aircraft. These engines are precisely machined and have fuel control systems which are sensitively constructed and do not tolerate a high level of contamination which is apt to foul the working parts of the control system. Therefore, during fueling of the aircraft, it is essential to know whether the fuel is sufficiently free of contaminants for proper aircraft usage.

Accordingly, it is one of the objects of the present invention, to provide an apparatus and process for continuously monitoring a liquid material, such as an aircraft fuel, the apparatus being operable to detect as low as 0.1 to 1 part contamination per million independently of color, density, or other qualities of a liquid that normally disturb the sensitivity of previous instruments which are capable of detecting this low concentration of contamination, and that cause the previous instruments to record a false or incorrect contamination reading.

It is another object of the invention to provide a liquid testing device having a liquid-sampling portion located in proximity with the fuel being tested, and having a second recording portion located remotely from the sampling portion so that the operator is removed by a safe distance from the liquid undergoing surveillance. It is a further feature of the invention that the recording portion can be combined with a plurality of distinct sampling devices so that the liquid can be tested at numerous different locations but with a single recording device which operates intermittently with a selected one of said plurality of sampling devices.

It is a further object of the invention to detect contamination by means of a light scattering technique using apparatus in which the fluid undergoing test is subjected to illumination, and contaminants within the fluid produce a scattering of light detected in its intensity by a photocell means which is shielded to receive only the scattered light, with the result that the energization and output signal of the photocell means is a direct qualitative measure of the degree of contamination. This method of relating contamination to the output signal of a photocell means has proved to be a reliable and sensitive method of measurement except for the fact that stray light beams produce "noise," and the color, density and accumulative "disturbance contamination" of the apparatus tends to produce a signal which is not related solely to the degree of contamination. Hence, it is important to frequently calibrate the apparatus to provide two signals: one producible by a filtered sampling of the fluid and the other an unfiltered sampling of the fluid with all conditions of the apparatus otherwise the same so that, the output signal can be adjusted in its magnitude according to the degree of contamination. Consequently, disturbing influences in the form of change of density, color, stray light, and apparatus contamination do not bear directly on the reading of the apparatus, and the apparatus is therefore sensitive and reliable in its measurement of contamination.

It is a further object of the invention, not only to calibrate the instrument at its initial phase of operation, but to provide a series of intermittent calibration operations so that during use, as well as prior to usage, there is a continuous series of intermittent recalibrations so that even should the fuel or other liquid change in color, density or other property to introduce a non-contamination related light scattering, the photocell output signal is automatically calibrated to provide a signal output related only to the contamination.

It is a further object of the invention to provide an apparatus which includes additional safeguards for accurate operation. For example, a device intended to continuously measure the purity level of a fluid, is dependent upon receiving a reliable and continuous flow of said fluid. Hence, I include as part of my novel combination a device which will signal failure to receive a proper flow of fluid for measurement.

A further novel feature of the invention is provision of means to signal an, undue degree of contamination of the apparatus proper, indicating when the apparatus is unsuitable for further operation and should be serviced by cleaning before operation continues.

A further object of the invention is to provide means which signal any inability of the mechanism to make accurate calibrating operations because of inadequate supply voltage.

It is a further object of the invention to provide both visual and audible warning signals which can make known the conditions of: undue contamination of the liquid, malfunctioning of the test apparatus, or both, so that proper corrective steps can be taken.

A further object of the invention is to provide a novel electrical servo system by which the apparatus is periodically calibrated to obtain the necessary sensitivity and accuracy for detecting minute quantities of contamination.

Another object of the the invention is to provide a system which can be controlled for sensitivity in its measurement of the degree of contamination.

It is an important feature of the present invention that the operator has available to him not only an apparatus providing a qualitative measure of the contamination, but also has available to him a panel of colored lights which indicate at a glance the proper working condition of the apparatus and proper purity level of the fluid so that the operator knows that the purity level measurement provided by the apparatus is provided under proper operating conditions of the apparatus.

The above and other objects and features of the invention will become apparent from a consideration of the following description which proceeds with reference to the accompanying drawings, wherein:

FIG. 2 is a schematic view of the apparatus including the sampling portion, the control portion and instrument portion of the apparatus;

FIG. 3 is a wiring diagram illustrating the servo system for effecting calibration of the meter which indicates the level of impurity in the fluid; and, FIG. 4 is a schematic wiring diagram indicating how the apparatus is itself monitored to indicate when the apparatus should be serviced because of including excess contamination of the instrument proper.

Figure 1:
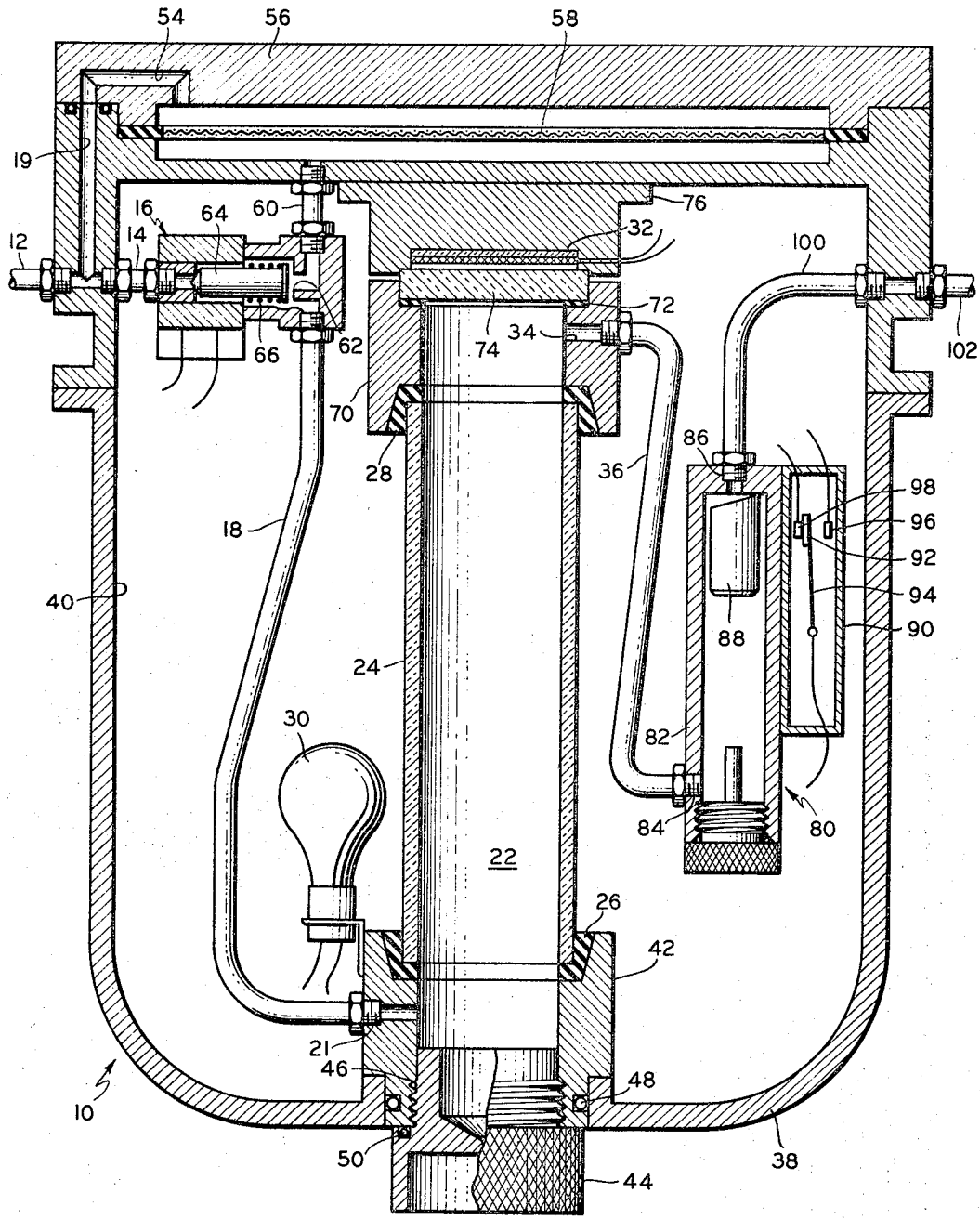
FIGURE 1 is a section view taken through the center of the fuel sampling portion of the test apparatus.

Referring now to the drawings, particularly FIG. 1, there is provided a pickup portion 10 of the test apparatus which is designed to receive a continuous flow of the liquid which is undergoing constant surveillance for its purity level, this portion of the device being generally located in proximity with the fluid being tested. A small amount of liquid is diverted from the main flow in appropriate amount, as for example 1000 ml./min. and is introduced through conduit 12 which is connected with a conduit 14 and a conduit 19. The conduit 19 is connected by a filter 58 to a conduit 60. A valve 16 having a solenoid operator 17 connects either the conduit 14 or the conduit 60 to conduit 18. Conduit 18 connects at an inlet 21 with a chamber 22 defined by a transparent tube 24 received at its opposite ends within sealing gaskets 26, 28. The tube 24 is known as a photometric tube and it includes shielding at its opposite ends so that light beams from light source 30 can reach the shielded photocell 32 only if they are scattered by striking suspended contaminants within the sample of liquid material which passes continuously through the photometric tube from line 18 and inlet 21 and leaves through outlet port 34 and outlet line 36. The principle of "light scatter" and why the photocell is responsive only to the scattered light and substantially no other light, is explained fully in my Patent No. 3,200,700 granted Aug. 17, 1965, and this principle will not be re-explained in this application as it does not form a part of the present invention. For details therefore, reference may be made to my patent regarding this particular phenomena. It is sufficient, for an understanding of the present invention to know that the intensity of the scattered light which reaches photocell 32 is directly related to the degree of contamination and therefore, the strength of the signal produced by photocell means 32 is directly related to the degree of contamination. This principle of detection of contamination and measuring qualitatively its amount according to turbidity of the fluid, is useful because the output signal can be calibrated to give a qualitative measurement of contamination if the source of contamination is known.

The pickup assembly is housed within a red brass casting 38 having a reflective inner surface 40, the assembly being generally of an explosion-proof design. The casting 38 lends support for the pickup assembly in general, and provides direct support for the adapter 42 having a cleaning plug 44 which includes a threaded connection 46 with the adapter 42. O-ring seals 48 and 50 can be included to insure that no fluid can leak through the bottom end of the photometric tube.

At the upper part of the casting incoming fluid is directed from conduit 12 to conduit 19 where it connects with conduit section 54 in filter cover 56, then through filter 58 and conduit section 60, past valve seat 62 and thence to conduit 18 when the valve 16 is positioned as shown in FIG. 1. Thus, when the valve 16 is in the position shown in FIG. 1 all the incoming fluid from conduit 12 goes through the filter 58 and then to conduit 18 connecting with the photometric tube 24. But in the normal position of the solenoid valve, the plunger 64 is urged by the spring 66 toward the right against seat 62 and prevents fluid movement through the filter 58; hence, all of the fluid from conduit 12 is unfiltered and passes from conduit 14 to conduit 18 and thence to the interior of the photometric tube 24.

By operation of the solenoid-controlled valve 16, the incoming fluid from conduit 12 is either unfiltered or filtered before it reaches photometric tube 24 and this is the manner by which the measuring device is calibrated.

To complete the description of the photometric tube 24, the top thereof is supported through a gasket 28 which is received within an adapter 70 having a sealing ring 72 and sight glass 74 mounted thereon to protect the photocell 32 which, in turn, is nested within a cap 76 which can form an integral portion of the casting 38.

After the liquid sample has left the photometric tube 24 through line 36, it is channeled to a flow monitor 80 comprising a cylinder 82 having an inlet 84 and outlet 86, and a plunger 88 suitably mounted for vertical support by the current of uprising fluid flow. Directly adjacent monitor 80 is a switchbox 90 having a magnetic switch 92 mounted on a switch arm 94 and a pair of contacts 96 and 98, the magnetic switch 92 being in engagement with contact 98 when the plunger 88 is raised and moving toward the right into engagement with contact 96 when the plunger 88 lowers responsively to insufficient flow. In this way, the rate of flow of the fluid to the sampling device is under constant surveillance.

After leaving the flow meter 80, the fluid passes through a conduit 100 and is returned to the main flow of fluid under pump pressure or at a location of supply line pressure which provides for re-inlet flow of the diverted sample.

The pickup assembly, designated generally by reference numeral 10 (FIG. 1), is shown schematically in FIG. 2 by the portions to the left of the vertical dotted line in FIG. 2. This portion of the device is located in proximity with the fuel being tested. The pickup portion 10 is connected through a cable with a recording assembly designated generally by reference numeral 104. The recording assembly includes: a meter 106 for indicating the amount of contamination in the fluid passing through the photometric tube 24; a servo system 107 (FIG. 3) for calibrating the meter 106 to zero contamination when filtered fluid passes through the photometric tube; and, additional test indicating devices in the form of a panel 108 of lights which are arranged in tiers of red lights and green lights which register whether the photometric tube 24 is in a proper state of cleanliness, whether the voltage is at an appropriate amount, whether flow is proceeding in correct amount, and whether the contamination level of the liquid under test is sufficiently low.

The control assembly, while not limited to any particular source of power, is generally operated by batteries which permit the apparatus to be portable so that the entire assembly can be mounted within a wheel supported carriage or the like and transported easily from one place to the other. There is combined with the power supply, a voltage regulator 110, which will operate under a voltage fluctuating between about 11 and 14 volts direct current voltage for example, and will provide a constant voltage through conductor 112 to the light 30 thereby providing constant illuminating energy to the light bulb 30 which may be of 35 watts or so and 10.2 v. rated voltage. It is essential, that the light 30 provide constant illumination since the device is calibrated with filtered and then unfiltered fluid and the difference between the signal pickup obtained by the photocell 32 should be attributable only to the change in light scattered by the contaminants, and not owing to any fluctuation of illumination from the bulb 30. Should the voltage fluctuate unduly, conductors 114 and 116 leading to the pair of lights 118 will cause the red light 120 to flash on and green light 122 will go off to signal that the apparatus cannot be operated properly by reason of the unsuitable voltage level.

Periodically, during operation of the apparatus, and before the start of any testing procedure, the switching circuit 124 is operated to bring the meter reading needle 126 to a zero contamination reading. Concurrently all of the incoming fluid from conduit 12 is shunted through filter 58 so that the apparatus will provide a photocell energization under illumination from light 30 using a filtered fluid. Therefore, since a zero meter reading is proper, the instrument is thereby calibrated to provide zero contamination for a filtered fluid. When unfiltered fluid is next passed through the photometric tube, the change in energization of the photocell 32 from illumination by bulb 30 will be attributed solely to contamination and the change is recorded qualitatively by the needle 126 on the meter 106. The reading is attributed solely to the contamination and is independent of color, density, and instrument cleanliness all of which factors are excluded from the meter reading during calibration. Switching circuit 124 is operated for calibration purposes, typically for about 30 seconds during each four-minute measuring cycle and the measuring operation is always initiated with a balancing cycle.

The switching circuit 124 includes a timed switching means whereby the balancing means is periodically operated to provide a balancing cycle followed by the passage of unfiltered flow through the apparatus.

During a balance cycle, the switch circuit 124 communicates voltage from regulator 110 through conductor 130 and then through conductor 132 to the solenoid valve 17, effecting positioning of the valve 16 as shown in FIG. 1 so that all of the fluid from conduit 12 passes through conduit 19 and conduit 54 past filter 58 through conduits 60 and 18 (FIG. 1) to the interior 22 of the photometric tube 24.

The switch circuit 124 also, transmits voltage through conductor 134 to servo amplifier 136 (FIG. 3). Voltage is also communicated, through contacts 138 with a bridge circuit having branch resistances 140, 142, a servo potentiometer 144 and photocell 32. Any unbalance of the bridge circuit will be amplified by linear amplifier 146 and communicated through conductor 148 to the servo amplifier 136 and to meter 106 and the output of the bridge circuit after being amplified by servo amplifier 136 will be communicated to a motor control 152 through conductor 154 to the motor 156 which adjusts the servo potentiometer 144 until there is zero output of the bridge circuit and hence zero reading of the meter 106.

When the balancing is completed, the switch circuit 124 shunts out the servo amplifier, motor control 152, motor 156 and servo potentiometer 144 and again operates solenoid 17 to position valve 16 such that plunger 64 is moved to the right (FIG. 1) and the incoming fluid from conduit 12 is not passed through filter 58 but goes directly to conduit 18 and to the photometric tube 24. Any increase of scattered light, owing to contaminants which are now unfiltered from the fluid, will increase the output signal of the photocell 32 which, passes to the linear amplifier 146 and through conductor 164 to the meter 106 to effect a deflection of the needle 126 thereby providing a qualitative measurement of the amount of contamination. If the deflection of the meter needle 126 should signify excessive contamination it will, acting through a switch 150 effect actuation of alarm horn 153. In addition thereto, the pair of lights 155 are connected with servo amplifier 136 to indicate, through the green light 157, that the contamination level is acceptably low; and, red light 158 is turned on at an upper limit of contamination level to signal an unacceptable level of contamination. The meter 106 can be sensitized or desensitized depending upon which of the resistances 160, 162, 163, and 166 are connected in parallel with the linear amplifier through the selector switch 168.

Since the operation of the device depends upon an adequate and continuous supply of sample fluid from conduit 12, the flow monitor 80 is essential to indicate whether the sampling device 10 is receiving its proper amount of fluid and accordingly, the flow monitor 80 is connected through conductors 170, 172 to a pair of lights 174, the green light 176 being actuated when the plunger 88 is at an acceptable level, being positioned thereat by a proper degree of flow to move magnetic switch 92 to the left into engagement with contact 98. Should the flow rate drop off, the plunger 88 will lower, and magnetic switch 92 will move switch arm 94 toward the right bringing the switch 92 into engagement with contact 96 thereby actuating red light 178 signaling that for some reason, such as clogging of the filter 58, fouling of conduit 12 or for some other reason, the device is incapable of providing accurate indication of contamination because inlet sampling flow of fluid is insufficient.

During calibration, when filtered fluid passes through the photometric tube, there should be only a relatively slight movement of the servo potentiometer required to calibrate the meter to zero contamination position. Should the tube proper be excessively contaminated, however, there will be a considerable amount of light scattering to energize the photocell 32 whereby its signal will require considerable movement of the servo potentiometer 144 in which case, this fact should be made known to the operator so that he can clean the photometric tube since excessive contamination could interfere with the sensitivity of the meter when unfiltered fluid passes through photometric tube 24. If the calibrating movement is excessive, then potentiometer 144 (FIG. 3) will close switch 180 completing the circuit to relay 182 to move switch 184 downwardly and thus energize red light 186. Normally, the switch 184 is in engagement with contacts 188 completing the circuit necessary for actuating green light 190 and contacts 192 are open.

*Operation*

In operation, the meter 106 registers the difference between light scattering effected by unfiltered and filtered fluid and therefore minimizes the sensitivity of the apparatus to changes in composition, color, to unfilterable haze, and conditions of cleanliness of the apparatus proper. These factors are not a measure of the contamination of the liquid and, in fact, tend to contribute negatively to the accuracy of measurement. The apparatus also monitors its own condition of cleanliness, whether it is receiving an adequate sampling of flow, and whether its voltage is adequate to perform a proper measuring function. The operation will provide not only a qualitative measurement of the amount of contamination, but will signal, by prearranged sensitivity, a degree of contamination which is in excess of a prescribed amount and will also provide an audible signal if this additional warning is desired.

At the start of operation, the switching circuit 124 is operated to actuate solenoid valve 16 such that the plunger 64 is located as shown in FIG. 1 whereby all of the incoming fluid from conduit 12 is passed through conduit 19 and filter 58, thence through conduits 60 and 18 to the interior 22 of photometric tube 24 where it passes continuously upwardly and exits through conduit 36 to the flow monitor 80. The fluid leaves flow monitor 80 through conduits 100 and 102, and is returned to the main flow of fluid which is about 10 p.s.i. lower than the sampling point and, if necessary a small pump can be included for returning the sample flow to the main flow. Sample flow, can be in any desired amount, but it is essential that the sample flow be representative in composition of the main flow, and also the flow must be continuous and at substantially the same rate as the main flow being tested.

My invention is not limited to the testing of any particular kind of liquid material and can be used for numerous different applications where it is necessary to continuously test for the purity of a liquid and although the present invention was developed to meet the purity requirements of fuels in jet engine applications, it is also possible, with relatively little or no modification to adapt the invention for use in refineries, chemical processing, filtration plants, boiler feedwater applications, breweries, edible oil industries and others.

The operation of the apparatus is fully automatic and the information regarding purity level of the fluid can be provided visually, audibly, and can also be used to shut off the main liquid flow if contamination reaches an objectionable level.

When the switching circuit 124 is operated, at the start of the operation, for about 30 seconds, only filtered fluid is passed through the photometric tube 24 and concurrently therewith, the meter 106 is adjusted to zero reading. That is, when the output signal is obtained from the photocell 32 by scattered light within the photometric tube 24 while filtered fluid is passing through the photometric tube 24, the meter is adjusted to zero reading by means of the servo system shown in FIG. 3. During this time, the bridge circuit receives voltage from the contacts 138. If the bridge circuit is unbalanced by a signal output produced by the photocell 32, the bridge circuit will communicate a signal through linear amplifier 146 and conductor 148, servo amplifier 136, motor control 152 and motor 156 to adjust the servo potentiometer 144 so that balance is achieved with the output of photocell 32. The bridge circuit will then produce zero output and therefore meter 106 will receive no current and be at zero impurity reading with whatever photocell signal output is generated with a filtered fluid. The time period for this adjustment is variable but after the calibration period, the switching circuit 124 will cut out the servo amplifier 136, and concurrently, operate the solenoid valve so that the valve plunger 64 is moved to the right into sealing engagement with valve seat 62 and all of the fluid coming in from conduit 12 will bypass the filter 58 and flow through conduits 14 and 18 so that the photometric tube is now filled with unfiltered fluid. Since this fluid is the same as the filtered fluid by reason of having the same color, density and unfilterable turbidity, the output signal obtained from the photocell 32 is a function of scattered light obtained from suspended solid contaminants which are filterable. This signal, will also be exclusive of "stray" light noises and contamination of the photometric tube proper. Thus, I isolate the portion of the photocell signal attributable only to the filterable contaminants and provide a sensible qualitative measurement of said contaminants according to the deflection of the needle 126 of meter 106. The meter can itself be calibrated by selecting one of the resistances 160–162–163–166 by the switch 168 so that the range of movement of the meter needle can be made responsive to a selected amount of contamination. For example one unit of deflection of the needle can refer to .001 p.p.m. contamination or 0.01 p.p.m. contamination and so forth. Also, by making the instrument more sensitive to contamination, a full swing of the needles indicating maximum deflection, will sound the alarm 153 by closing contact 150 at unacceptable orders of contamination. It is thus possible, to sensitize or desensitize the system at will and combine both visual and audible alarms.

Should the pickup portion of the assembly, be lacking at any time in sufficient inlet flow, so that the apparatus is incapable of rendering an accurate monitoring of the fluid, then the flow meter 80 will turn on red light 178 of the pair of lights 174 and turn out green light 176 so that the operator will know that the apparatus is incapable of proper functioning and it will pin-point the problem to one of improper inlet flow. The flow monitor achieves its result by causing the plunger 88 to drop responsively to insufficient flow and magnetic switch 92 on switch arm 94 will make contact with 96 and break contact with 98 to turn off green light 176 and turn on red light 178.

If for any reason, the voltage drops to an unsafe level so that luminosity of the lamp 30 changes and deflection of the meter needle 126 is not attributable to contamination but rather change of luminosity because of change of voltage, the reduction in voltage will turn off green light 122 of the pair of lights 118 and turn on red light 120 so that once again the operator is aware that the apparatus is incapable of performing satisfactorily and the problem is pin-pointed to insufficient voltage.

If, during calibration, the output signal of photocell 32 becomes excessively high so that servo potentiometer 144 is actuated unduly to nullify the signal from photocell 32 by an amount actuating switch 180 this will be indicative of excessive contamination of the photometric tube 24 and will (FIG. 4), acting through relay 182 cause the switch 184 to break contact with contacts 188 thereby turning off green light 190 and making contact with contacts 192 to turn on red light 186 indicating that the apparatus should be shut down and serviced.

The operator thus has available to him, in addition to the meter which provides a measurement of qualitative contamination a ready means for determining from the control panel whether or not the apparatus is functioning satisfactorily by simply glancing at the bank of green lights and if they are all lit it is known that the apparatus is functioning satisfactorily. Should however, any of the red lights flash on, it will be apparent that there is either excessive impurity in the liquid or that some portion of the apparatus is not functioning making it impossible for the operator to obtain a reliable monitoring of the fluid. The red light when flashed on, also advises the operator what is the nature of malfunctioning of the apparatus, simplifying the difficulties of adjustment and servicing.

It has been possible, using the apparatus as described, to detect impurities in the order of .05 p.p.m. and under certain circumstances 0.05 p.p.m. to as low as 0.01 p.p.m. using red iron oxide as the calibration material.

It is possible, by providing a plurality of lead-in conductors from a number of sampling stations such as shown in FIG. 1, to monitor a system at different locations each having its pickup, but leading to a single recording device. That is, the structure shown in FIG. 1 (the left-hand portion of FIG. 2) can be located at different places of the system and, by suitable switching means (not shown) determine which of the flow monitors is connected with the recording system shown to the right of the dashed line in FIG. 2. In this way, the liquid condition is check pointed at will in any selected point.

It should be further noted, that the sensitivity of the system is independent of many factors which previously disturbed accurate reading of the meter needle at the low orders of contamination which it is possible to detect in the present invention. That is, by periodic calibration of the meter, which takes place in repetition cycles and entirely automatically, the mechanism is self adjusting to be at the proper calibration for a specific color, density, and unfilterable turbidity of sample. It is possible to eliminate these disturbing influences and thus contribute to greater accuracy including further the shunting out of such other error-producing means as stray light and instrument contamination. These calibration adjustments are made from time to time in order to maintain the high level of sensitivity and freedom from error-producing influences. Such results are obtainable completely automatically. As a further consequence of my invention, I provide a capability of measuring the degree of contamination in any transparent liquid regardless of its color and composition. Moreover, the instrument is automatically readjusted with changes in color or composition of the liquid during the operation and the level of contamination is available immediately for use of the individual.

It should be noted that the apparatus requires only slight power consumption and is operable on conventional 12 volt storage batteries; and, there being no need for line voltages, the apparatus is therefore independent of commonplace line voltage failures.

The scattered light which is receivable by the photocell 32 generates a very weak signal and before this signal can be used in calibrating the meter or in deflecting the meter needle 126 it must be amplified but without distorting its value. Accordingly, it is necessary, in view of the fact that the scattered light which in the first instance reaches photocell 32 is very weak compared to the direct illumination of bulb 30 to shield the photocell 32 against stray light and make it responsive only to scattered light and at the same time amplify the weak signal generated by the photocell 32 without distorting it. All of these requirements dictate a constancy of voltage output from the regulator 110 which maintains the luminosity of light 30 constant so that any change of signal from the photocell 32 between filtered and unfiltered flow is attributable only to these unfilterable contaminations and not to change of luminosity of the bulb 30. Likewise, the signal must be amplified so that it is amplified by the same factor at all times before being transmitted to the meter 106 for reading and also for calibrating the meter by operating the motor 156. These results are achieved, by using a direct current battery source in combination with a voltage regulator so that in spite of the fluctuating voltage which varies between 11 and 14 volts there is a constant voltage output which will insure proper operation of the light and amplification of the weak signal to the meter for reading and for calibration.

Although the present invention has been illustrated and described, in connection with the single example embodiment thereof, it will be understood that this is illustrative of the invention and is in no sense restrictive thereof. It is reasonably to be presumed, that those skilled in the art can make numerous modifications and revisions of the invention to suit individual design requirements, and it is intended that such revisions and modifications as incorporate the herein disclosed principles, will be included within the scope of the following claims as equivalents of the invention.

I claim as my invention:

1. Apparatus for continuously testing the impurity level of liquid materials, comprising a chamber adapted to receive a continuous flow of liquid under test and for discharging said liquid, means associated with said chamber for illuminating the liquid under test within said chamber during its passage therethrough, photocell means for receiving only scattered light derived from illumination of contaminants in the liquid in said chamber, passage means connected to said chamber and having a divided flow path including a filter in one branch thereof and a valve for controlling the direction of flow whereby filtered or unfiltered liquid is controllably supplied to said chamber, outlet passage means through which the liquid passes out from the chamber, electrically controlled meter means for indicating the output of said photocell, a balancing circuit operatively combined with said meter and said valve whereby said electrically controlled meter means is calibrated to zero impurity during passage of filtered flow through said chamber, said balancing circuit including a timed switching means which periodically operates said valve to alternately pass filtered fluid with which the photocell is calibrated and unfiltered fluid which is to be tested to the chamber, and means for deactivating said balancing circuit to provide a meter reading responsive to said photocell means during passage of unfiltered liquid flow through said chamber and calibrated relative to said filtered flow.

2. The structure as set forth in claim 1 wherein a flow monitor means is disposed in the outlet passage to indicate flow of liquid through the container.

3. Apparatus for monitoring the purity of a liquid, comprising:

(a) means for providing a flow of liquid to be monitored;
(b) a chamber having an inlet for receiving said flow of liquid and having a transparent wall portion;
(c) a source of illumination positioned near said transparent wall portion;
(d) a photocell positioned near said transparent wall portion;
(e) a shield positioned near said photocell for excluding direct illumination thereof from said source and for permitting illumination thereof by light scattered from contaminants within said liquid;
(f) a valve having an outlet and first and second inlets that are selectively connected to said outlet;
(g) means directly connecting said first valve inlet to said means for providing a flow of liquid;
(h) filter means connecting said second valve inlet to said means for providing a flow of liquid;
(i) means connecting said valve outlet to said chamber inlet;
(j) indicating means responsive to said photocell to measure the degree of contamination in said liquid;
(k) and timed switching means connected to said valve and to said indicating means for periodically connecting said second valve inlet to said valve outlet to provide a filtered flow to said chamber to calibrate said indicating means, and for selectively connecting said first valve inlet to said valve outlet and causing said indicating means to indicate the contamination of said liquid.

References Cited

UNITED STATES PATENTS

| 1,938,004 | 12/1933 | Baden | 250—218 |
| 2,486,622 | 11/1949 | White | 88—14 |
| 2,783,390 | 2/1957 | Mendenhall. | |
| 2,819,608 | 1/1958 | McLaren et al. | |
| 3,033,036 | 5/1962 | Leisey | 88—14 X |

OTHER REFERENCES

Cleasby, John L. Turbidimetric Control of Filter Effluent Quality. In American Water Works Association Journal, vol. 52, p. 1411.

Sheen, "Automatic Stream Analysis by Colorimetry," Instrument Society of America Journal, vol. 6, No. 4, April 1959, pp. 34–38 only.

JEWELL H. PEDERSEN, *Primary Examiner.*

E. G. ANDERSON, *Examiner.*

T. L. HUDSON, W. A. SKLAR, *Assistant Examiners.*